United States Patent
Minamikawa

(10) Patent No.: US 8,537,419 B2
(45) Date of Patent: Sep. 17, 2013

(54) IMAGE FORMING APPARATUS AND IMAGE FORMING SYSTEM

(75) Inventor: Shunsuke Minamikawa, Nagoya (JP)

(73) Assignee: Brother Kogyo Kabushiki Kaisha, Nagoya-shi-, Aichi-ken (JP)

( * ) Notice: Subject to any disclaimer, the term of this patent is extended or adjusted under 35 U.S.C. 154(b) by 250 days.

(21) Appl. No.: 12/852,871

(22) Filed: Aug. 9, 2010

(65) Prior Publication Data

US 2011/0075167 A1 Mar. 31, 2011

(30) Foreign Application Priority Data

Sep. 30, 2009 (JP) ................ 2009-228056

(51) Int. Cl.
| | |
|---|---|
| G06K 15/00 | (2006.01) |
| G03F 3/08 | (2006.01) |
| H04N 1/38 | (2006.01) |
| H04N 1/40 | (2006.01) |
| G06T 5/00 | (2006.01) |

(52) U.S. Cl.
USPC ........... 358/1.9; 358/518; 358/463; 358/3.26; 358/3.01

(58) Field of Classification Search
USPC .......................... 358/3.01, 1.1–1.9
See application file for complete search history.

(56) References Cited

U.S. PATENT DOCUMENTS

| | | | |
|---|---|---|---|
| 6,384,934 | B1 | 5/2002 | Kohtani et al. |
| 7,187,879 | B2 | 3/2007 | Zaima |
| 7,880,941 | B2 | 2/2011 | Ohmiya |
| 2004/0125391 | A1* | 7/2004 | Zuber ........................ 358/1.9 |
| 2005/0190386 | A1 | 9/2005 | Zaima |
| 2006/0171001 | A1 | 8/2006 | Kitagawa et al. |
| 2007/0070460 | A1 | 3/2007 | Yamada |

(Continued)

FOREIGN PATENT DOCUMENTS

| | | |
|---|---|---|
| JP | 10-240082 | 9/1998 |
| JP | A-2000-184220 | 6/2000 |

(Continued)

OTHER PUBLICATIONS

Notification of Reasons for Refusal dated Aug. 11, 2011 received from the Japanese Patent Office from related Japanese Application No. 2009-228056, together with an English-language translation.

(Continued)

*Primary Examiner* — King Poon
*Assistant Examiner* — Ibrahim Siddo
(74) *Attorney, Agent, or Firm* — Scully, Scott, Murphy & Presser, P.C.

(57) ABSTRACT

An image forming apparatus comprising an image forming unit that forms an image based on a processing batch, a measurement unit, which interrupts the processing batch to form a density pattern by controlling the image forming unit, and which obtains density adjustment data by measuring the density pattern, and an adjustment unit that adjusts the density of the image based on the density adjustment data. When the measurement unit performs a density measurement before formation of a first color page of a processing batch, which includes monochrome and color pages, the adjustment unit adjusts the density of each color page using new density adjustment data obtained through the density measurement performed before the formation of the first color page, and the adjustment unit adjusts the density of each monochrome page using old density adjustment data obtained before the density measurement performed before the formation of the first color page.

5 Claims, 9 Drawing Sheets

(56) References Cited

U.S. PATENT DOCUMENTS

| | | |
|---|---|---|
| 2008/0130030 A1 | 6/2008 | Okunishi et al. |
| 2008/0170250 A1* | 7/2008 | Kitagawa et al. ............... 358/1.9 |
| 2008/0231875 A1 | 9/2008 | Ohmiya |
| 2008/0239400 A1* | 10/2008 | Yoshida ........................ 358/3.01 |

FOREIGN PATENT DOCUMENTS

| | | |
|---|---|---|
| JP | A-2003-25693 | 1/2003 |
| JP | A-2004-54143 | 2/2004 |
| JP | A-2005-189356 | 7/2005 |
| JP | A-2006-030422 | 2/2006 |
| JP | A-2006-212894 | 8/2006 |
| JP | 2007-90561 | 4/2007 |
| JP | 2007-111909 | 5/2007 |
| JP | 2008-102201 | 5/2008 |
| JP | 2008-139484 | 6/2008 |
| JP | A-2008-134376 | 6/2008 |
| JP | A-2008-233370 | 10/2008 |

OTHER PUBLICATIONS

Decision of Patent Grant dated Mar. 6, 2012 received from the Japanese Patent Office from related Japanese Application No. 2009-228056, together with an English-language translation.

* cited by examiner

IMAGE FORMING APPARATUS AND IMAGE FORMING SYSTEM

CROSS-REFERENCE TO RELATED APPLICATIONS

This application claims priority from Japanese Patent Application No. 2009-228056 filed on Sep. 30, 2009, the entire subject matter of which is incorporated herein by reference.

TECHNICAL FIELD

The present invention relates to an image forming apparatus and an image forming system. Specifically, the present invention relates to an image forming apparatus and an image forming system that that measures a density of an image to be formed and adjusts the density of the image.

BACKGROUND

A known image forming apparatus has a calibration function that performs a density measurement of an image to be formed and adjusts the image based on the density of the image. In the density measurement, for example, a density pattern, which includes a plurality of density patches having different densities, is formed. The density pattern is measured by sensors, and density adjustment data is obtained from the results of the measurement. Further, when an image is formed after the density measurement, the density of the image is adjusted to an optimum density by using the density adjustment data.

On the other hand, when an elapsed time or a number of printed sheets from the previous the density measurement exceeds certain criteria, that is, when a predetermined measurement execution condition is satisfied, the density measurement is performed. It is possible to secure image quality by performing the density measurement at an appropriate time.

SUMMARY

However, during the execution of one print job (one processing batch) including a plurality of pages, an image forming operation is interrupted while the above-mentioned the density measurement may be performed. In this case, among the pages included in the interrupted job, image density of pages formed before the density measurement and a image density of pages formed after the density measurement is adjusted based on different density adjustment data. For this reason, there is a problem in that the shade (gradation) of the image will be changed.

In view of above, exemplary embodiments of the present invention provide an image forming apparatus and an image forming system which may prevent the change in the shade between images, which is caused by the density measurement performed during the image formation of one processing batch.

DETAILED DESCRIPTION

Figure 1:
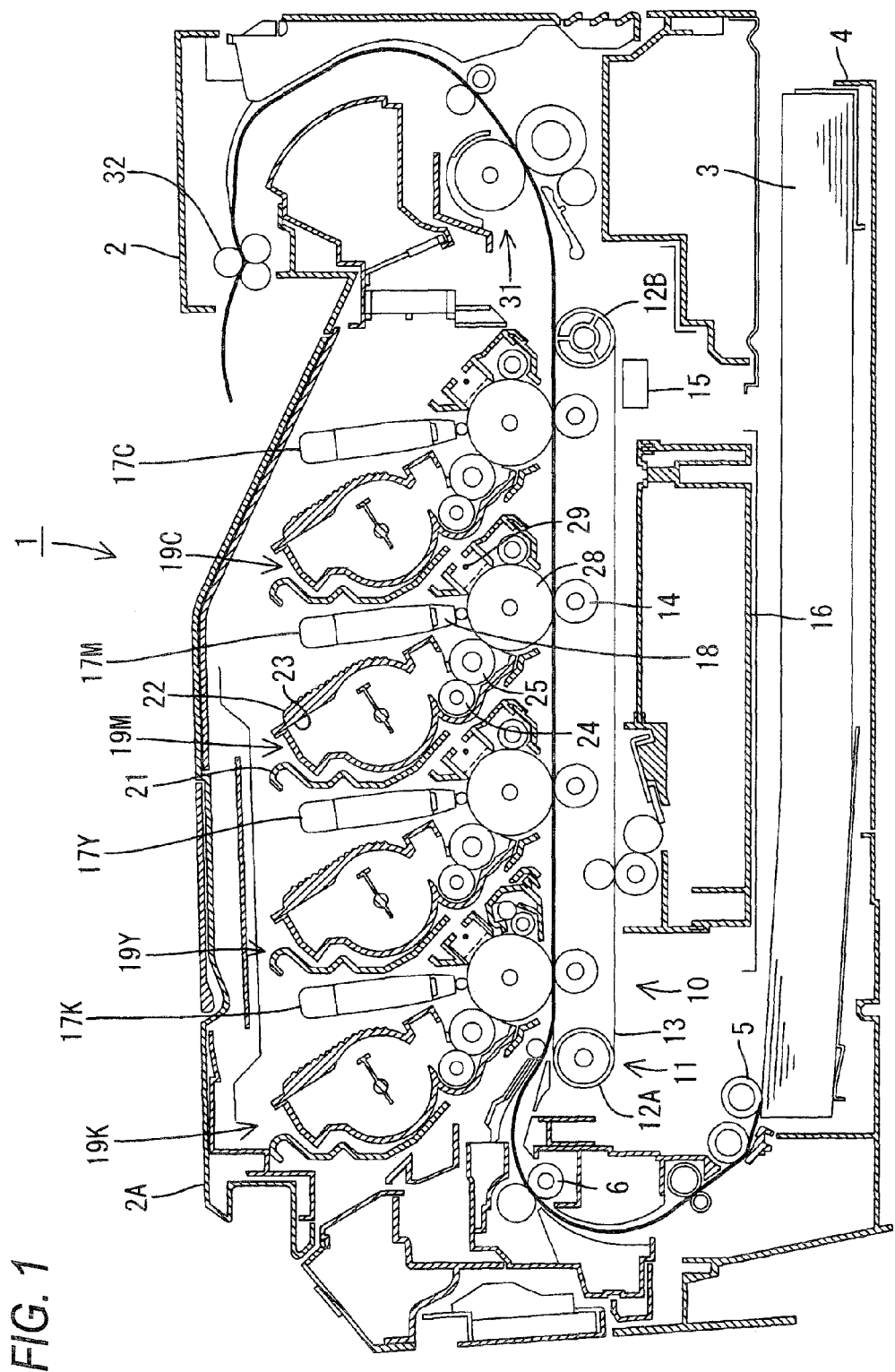
FIG. 1 is a side cross-sectional view showing the schematic configuration of a printer according to a first embodiment of the invention.

In view of above, according to a first exemplary embodiment of the invention provides an image forming unit that forms an image based on a processing batch including at least one page; a measurement unit, which interrupts the processing batch of the image forming unit to form a density pattern by controlling the image forming unit, and which obtains density adjustment data by measuring the density pattern; and an adjustment unit that adjusts the density of the image based on the density adjustment data, wherein when the measurement unit performs a density measurement before formation of a first color page during a processing batch, which includes both monochrome pages and color pages, the adjustment unit adjusts the density of each color page by using new density adjustment data obtained by the measurement unit through the density measurement performed before the formation of the first color page, and the adjustment unit adjusts the density of each monochrome page by using old density adjustment data that was obtained by the measurement unit before the density measurement performed before the formation of the first color page.

Accordingly, when the density measurement is performed by the interrupting the image formation prior to the formation of the first color page during the image formation of a processing batch in which monochrome pages and color pages are mixed, the density adjustment of each color page included in the processing batch is performed using new density adjustment data obtained by the density measurement at the time of the interruption, and the density adjustment of each monochrome page included in the processing batch is performed using old density adjustment data that is obtained before the density measurement at the time of the interruption.

Accordingly, it is possible to secure image quality by adjusting the density of the color page included in the processing batch by using new density adjustment data. On the other hands, by using the old density adjustment data it is possible to prevent a change in shade (density) caused by adjusting the density of the monochrome page before and after the density measurement. Further, since a color image is formed with the mixture of a plurality of colors, the change in the density of each color causes a lost color balance on a color page. In contrast, a color balance is not lost on a monochrome page on which an image is formed with only one color. Accordingly, it is considered that the image quality of a monochrome page is less affected by the density measurement than a color page. Therefore, it is possible to maintain image quality to some extent by performing an adjustment that uses old density adjustment data.

According to the second exemplary embodiment of the invention, the adjustment unit changes the density adjustment data of the monochrome pages from the old density adjustment data to the new density adjustment data after the interrupted processing batch is completed.

Accordingly, the density adjustment data, which is used for the density adjustment of a monochrome page, is changed over from old density adjustment data to new density adjustment data at the time between the processing batches. As a result, it is possible to prevent the change in shade between monochrome pages included in the respective processing batches.

According to the third exemplary embodiment of the invention, when a measurement execution condition is satisfied during the image formation of a processing batch including color pages and optionally including monochrome pages, the measurement unit performs the density measurement if the first color page has not yet been formed, and the measurement unit does not perform the density measurement if the first color page has already been formed.

Accordingly, since the density measurement is not performed after the formation of the first color page, it is possible to prevent the change in shade between the color pages in the one processing batch.

According to the fourth exemplary embodiment of the invention, wherein before the execution of the image formation of the processing batch including both monochrome pages and color pages, the measurement unit determines whether the measurement execution condition is satisfied during the image formation of the processing batch including both monochrome pages and color pages, and during the image formation of the processing batch including both monochrome pages and color pages, when the measurement unit determines that the measurement execution condition is satisfied and there is a monochrome page before a first color page of the processing batch, the measurement unit performs the density measurement before the formation of the first color page.

Accordingly, it is possible to delay the timing of the performance of the density measurement as compared to when the density measurement is performed before a start of the image formation in the processing batch. Consequently, it is possible to reduce the frequency of the density measurement. Moreover, since the density measurement is performed before the formation of the first color page, it is possible to prevent the change in shade within the processing batch.

According to the fifth exemplary embodiment of the invention, each processing batch corresponds to one print job.

Accordingly, it is possible to prevent the change in shade between pages on which images are formed in one print job. Accordingly, the fifth exemplary embodiment of the invention is advantageous for a user.

According to the sixth exemplary embodiment of the invention, the image forming unit includes a plurality of development units, which change electrostatic latent images into visible images using a developer, and the adjustment unit adjusts a voltage applied to the development units at the time of the density adjustment based on the density adjustment data.

According to the seventh exemplary embodiment of the invention, an image forming system comprising: an image forming apparatus comprising: an image forming unit that forms an image based on a processing batch including at least one page; a measurement unit, which interrupts the processing batch of the image forming unit to form a density pattern by controlling the image forming unit, and which obtains density adjustment data by measuring the density pattern, and an adjustment unit that adjusts the density of the image based on the density adjustment data, and an information processing apparatus that communicates with the image forming apparatus, wherein when the measurement unit performs a density measurement before formation of a first color page during a processing batch, which includes both monochrome pages and color pages, the adjustment unit adjusts the density of each color page by using new density adjustment data obtained by the measurement unit through the density measurement performed before the formation of the first color page, and the adjustment unit adjusts the density of each monochrome page by using old density adjustment data that was obtained by the measurement unit before the density measurement performed before the formation of the first color page.

Accordingly, with the seventh embodiment it may be possible to obtain the same advantages as the first exemplary embodiment of the invention.

According to exemplary embodiments of the invention, during the image formation of a processing batch in which monochrome pages and color pages are mixed, when the density measurement is performed by interrupting the image formation before the formation of the first color page, the density adjustment of the color page included in the processing batch is performed using new density adjustment data that is obtained by the density measurement at the time of the interrupt, and the density adjustment of the monochrome page included in the processing batch is performed using old density adjustment data that is obtained before the density measurement at the time of the interruption.

Accordingly, it is possible to secure image quality by adjusting the density of the color page included in the processing batch by using new density adjustment data. On the other hand, it is possible to prevent a change in shade (density) caused by adjusting the density of the monochrome page using the same old density adjustment data before and after the density measurement. Further, since a color image is formed with the mixture of a plurality of colors, the change in the density of each color causes a loss in color balance on a color page. In contrast, a color balance is not lost on a monochrome page on which an image is formed with only one color. Accordingly, it is considered that the image quality of a monochrome page is less affected by the density measurement as compared to that of a color page. Therefore, it is possible to maintain image quality to some extent by using an adjustment that uses old density adjustment data.

First Embodiment

A first embodiment of the invention will be described below with reference to FIGS. 1 to 6.
(Entire Configuration of Printer)

FIG. 1 is a side cross-sectional view showing a schematic configuration of a printer 1 (one example of an image forming apparatus) according to this embodiment. The printer 1 is an electrophotographic color LED (Light-Emitting Diode) printer. Meanwhile, the left side in FIG. 1 is referred to as a front side in the following description. Further, some of the reference numerals of the same components corresponding to respective colors are omitted in FIG. 1.

The printer 1 is provided with a main body casing 2. A supply tray 4 in which a plurality of sheets 3 (one example of recording media) can be stacked is mounted at the bottom of the main body casing 2. A sheet feed roller 5 feeds the sheets 3 stacked in the supply tray 4 to a registration roller 6, which is provided above the supply tray. The registration roller 6 conveys the sheet 3 onto a belt unit 11 of an image forming unit 10.

The image forming unit 10 includes a belt unit 11, exposure units 17K to 17C, process units 19K to 19C, and a fixer 31.

The belt unit 11 has a structure in which an annular belt 13 is stretched between a pair of (front and rear) belt support rollers 12A and 12B. When the belt 13 is driven, a sheet 3 attached electrostatically on the belt 13 is conveyed toward the rear side. Further, transfer rollers 14 are provided inside of the belt 13 so that the belt 13 is interposed between the transfer rollers and photosensitive drums 28 of process units 19K to 19C to be described below and the transfer rollers face the photosensitive drums, respectively.

Each of the exposure units 17K, 17Y, 17M, and 17C corresponds to each of the colors black, yellow, magenta and cyan. Further, an LED head 18, where a plurality of LEDs is arranged in line, is provided at the lower end of each of the exposure units. The light emission of each of the exposure units 17K to 17C is emitted based on printing data, and each of the exposure units emits light to lines one by one on the surface of the corresponding photosensitive drum 28 from the LED head 18.

A pattern sensor 15, which is used for detecting a pattern formed on the belt 13, is provided below the belt 13. The pattern sensor 15 irradiates light to the surface of the belt 13, receives reflected light by phototransistors or the like, and output signals that have a level corresponding to the amount of received light. A cleaner 16, which collects toner, paper dusts, etc. adhering to the surface of the belt 13, is provided below the belt unit 11.

Each of the process units 19K, 19Y, 19M, and 19C correspond to each of the colors black, yellow, magenta and cyan, and the each of the process units includes frames 21 and developing cartridges 22. Each of the developing cartridges 22 (one example of developing units) includes a toner storage chamber 23, a feeding roller 24, and a developing roller 25. The toner storage chamber 23 stores toner corresponding to each color. The toner discharged from the toner storage chamber 23 is supplied to the developing roller 25 through the rotation of the feeding roller 24, and is positively charged by friction between the feeding roller 24 and the developing roller 25.

Further, the photosensitive drum 28 and a scorotron type charger 29 are provided below the frame 21. The photosensitive drum 28 includes a photosensitive layer, which has a positive charging property, is formed on the surface of a cylindrical drum main body, which is electrically grounded. As the photosensitive drum is rotated, the surface of the photosensitive drum 28 is uniformly positively charged (for example, +900V) by the electric discharge from the charger 29. Further, the surface of the photosensitive drum is exposed to the light emitted from the exposure units 17K to 17C, so that the potential of the surface of the photosensitive drum is partially lowered according to the intensity of irradiated light (for example, +100 V). Thus, an electrostatic latent image corresponding to an image to be formed on a sheet 3 is formed on the surface of the photosensitive drum.

Then, the positively charge toner carried on the developing roller 25 is supplied to the electrostatic latent image, which is formed on the photosensitive drum 28, by a developing bias voltage (for example, +450 V) applied to the developing roller 25. Accordingly, the electrostatic latent image formed on the photosensitive drum 28 is changed into a visible image.

While the sheet 3 placed on the belt 13 passes through transfer positions between the photosensitive drum 28 and the transfer roller 14, the toner images carried on the photosensitive drum 28 are sequentially superimposed onto and transferred to the sheet 3 by a transfer bias voltage (for example, −700 V) applied to the transfer roller 14. The sheet 3 to which the toner images have been transferred is fed to the fixer 31 that is provided on the rear side in the main body casing 2, and the fixer thermally fixes the toner images to the sheet 3. After that, a discharge roller 32 conveys the sheet 3 upward to discharge the sheet to the upper surface of the main body casing 2.

(Electrical Configuration of Printer)

Figure 2:
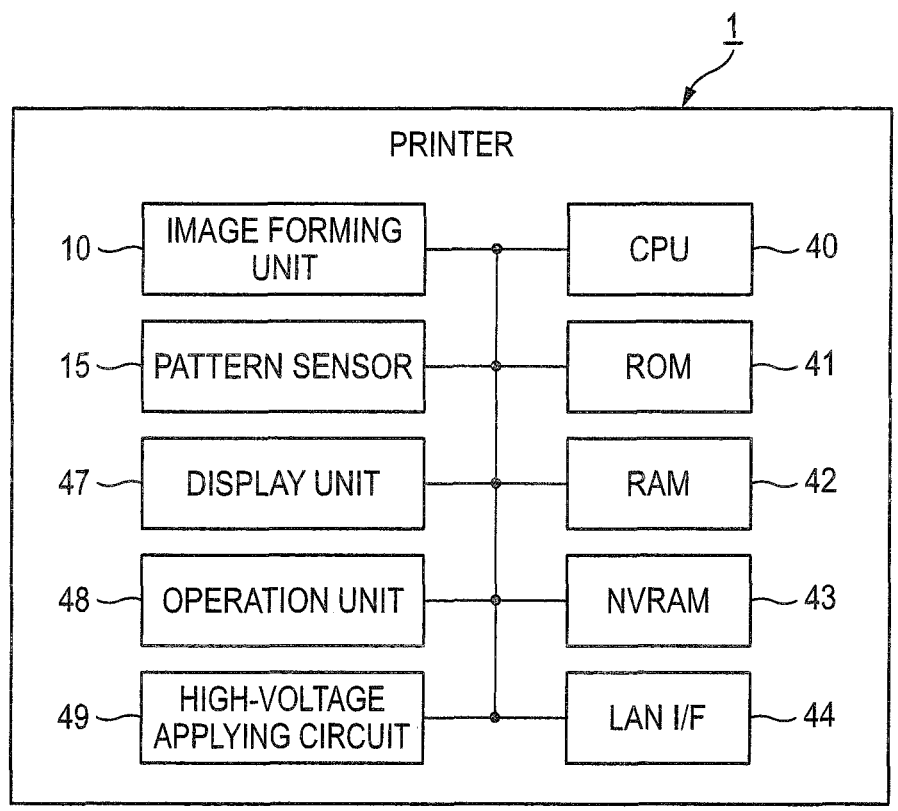
FIG. 2 is a block-diagram showing the electrical configuration of the printer.

FIG. 2 is a block diagram showing the electrical configuration of the printer 1.

As shown in FIG. 2, the printer 1 includes a CPU 40, a ROM 41, a RAM 42, a NVRAM (nonvolatile memory) 43, and a network interface 44. Programs for executing various operations of the printer 1, such as job execution processing to be described below, are stored in the ROM 41. The CPU 40 (one example of a measurement unit and an adjustment unit) controls each part in accordance with the program read out from the ROM 41, while storing the processing results in the RAM 42 or the NVRAM 43. The network interface 44 is connected to an external computer (not shown) or the like through a communication line such as a LAN, so that data communication can be performed between the external computer and the network interface.

Further, the printer 1 includes the image forming unit and the pattern sensor but also includes a display unit 47 and an operation unit 48. The display unit 47 includes a display, a lamp, etc., and allows the display of various settings screens, the operational state of an apparatus, etc. The operation unit 48 is provided with a plurality of buttons, and allows a user to input various instructions.

Further, the printer 1 includes a high-voltage applying circuit 49, which applies a voltage to the transfer rollers 14, the developing roller 25, the charger 29, etc. The CPU controls the high-voltage applying circuit 49 to adjust an applied voltage, which is applied to each unit.

(Job Execution Processing)

Figure 3:
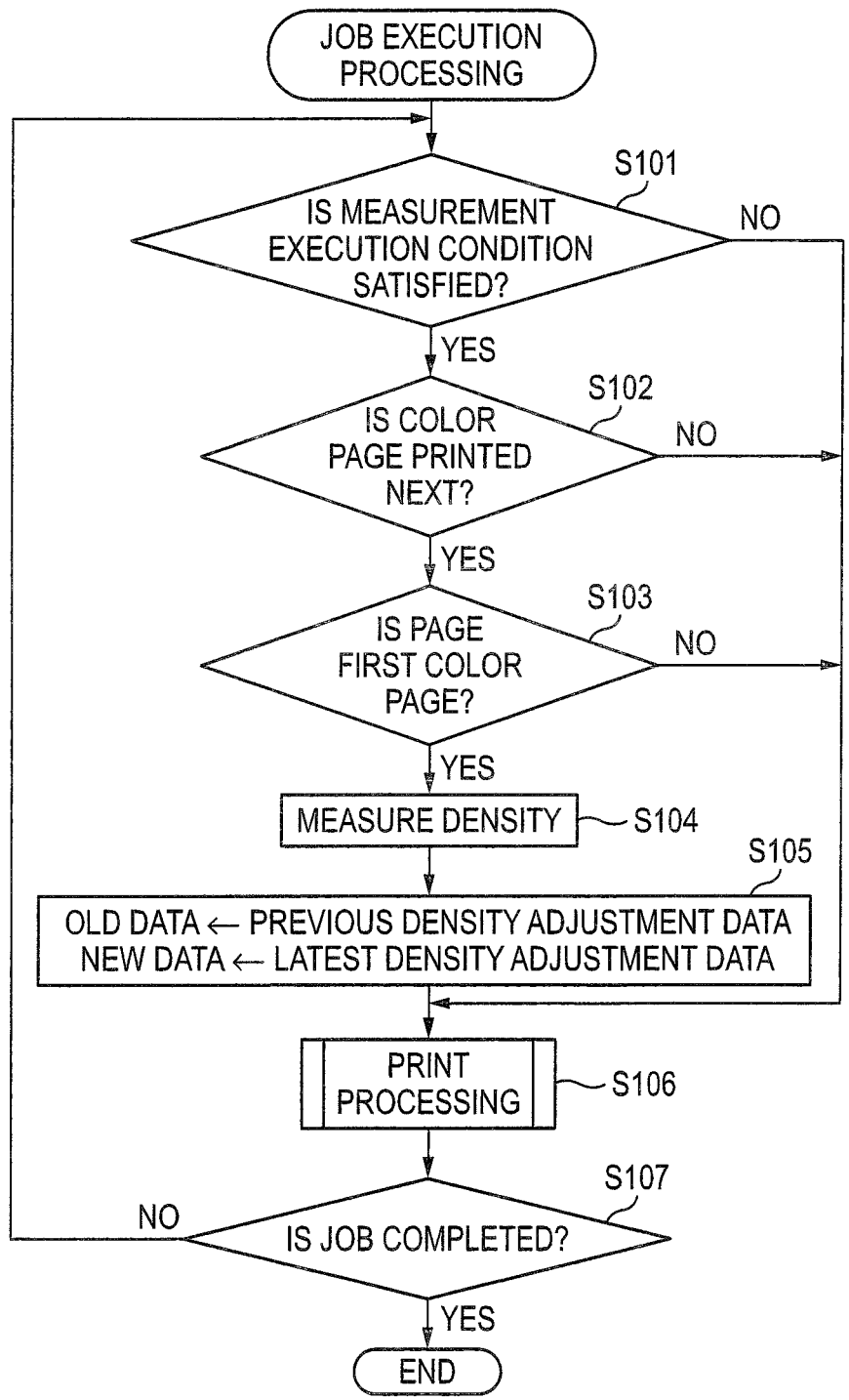
FIG. 3 is a flowchart showing job execution processing.
Figure 4:
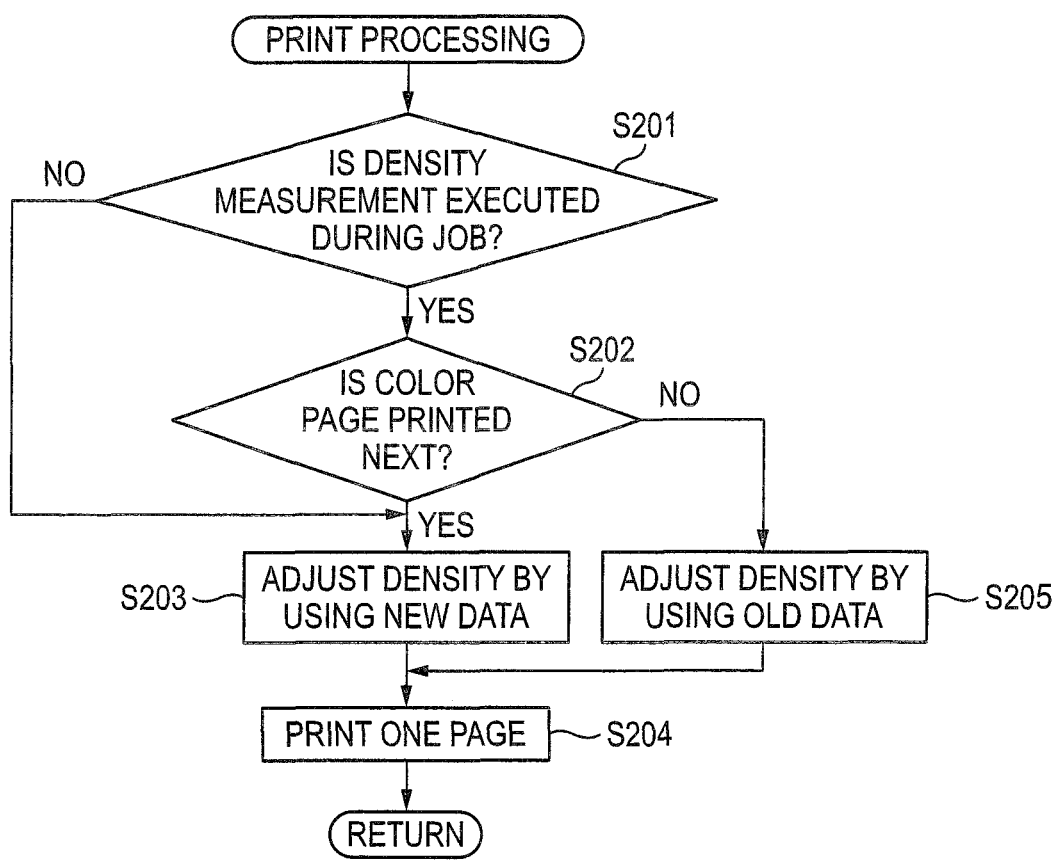
FIG. 4 is a flowchart showing print processing.

FIG. 3 is a flowchart showing a job execution processing, and FIG. 4 is a flowchart showing print processing.

If the CPU 40 receive a print job (a print request, one example of a processing batch), which is sent from an external computer or the like, through a network interface 44, the CPU 40 registers the print job in a print queue. A plurality of print jobs will be registered in the print queue, and the CPU 40 sequentially executes job execution processing, which is shown in FIG. 3, for each of the print jobs registered in the print queue.

First, the CPU 40 determines whether a predetermined measurement execution condition is met in the job execution processing (S101). The measurement execution condition is a condition that is used to determine whether the density measurement needs to be executed (or whether it is preferable to execute the density measurement) in order to secure image quality. Specifically, the measurement execution condition means that, for example, time elapsed from the execution of the previous the density measurement, the number of printed sheets, or the change of temperature is equal to or larger than a specific criterion.

If the measurement execution condition is met (Yes in S101), the CPU 40 determines whether the page to be printed next is a color page (S102). If a page to be printed next is a color page (Yes in S102), the CPU further determines whether the color page is a first color page of a print job to be executed in the job execution processing (hereinafter, referred to as a subject job) (S103). If a page to be printed next is a color page (Yes in S103), the CPU 40 performs the density measurement to be described below (S104).

Figure 5:
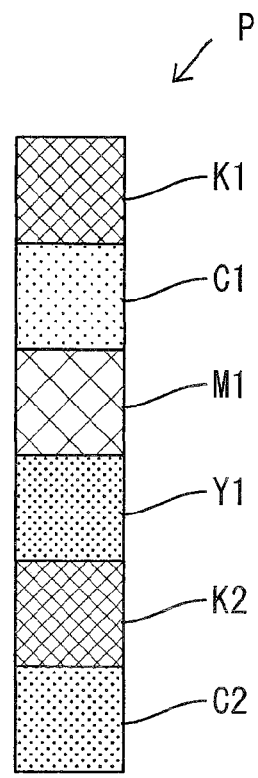
FIG. 5 is a view showing a density pattern.
Figure 5:
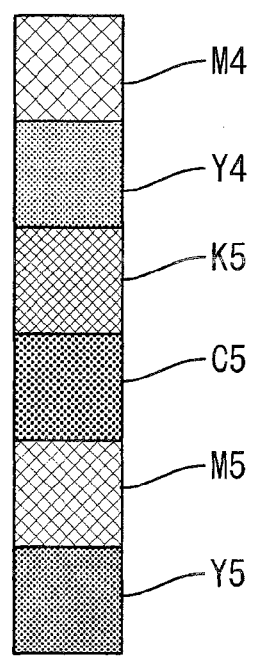

In the density measurement, for example, a density pattern P shown in FIG. 5 is formed first on the belt 13 by controlling the image forming unit 10. The density pattern P is formed by a plurality of patches that are arranged in line in a moving direction of the belt 13. In more detail, the density pattern P includes five patches having different densities for each of the colors, i.e. black, yellow, magenta, and cyan (black patches K1 to K5, cyan patches C1 to C5, magenta patches M1 to M5, and yellow patches Y1 to Y5; a part of the patches are not shown).

Then, the density of each of the patches is measured by the pattern sensors 15. Based on the result of the density measurement, density adjustment data is calculated for each of the colors. The density adjustment data adjusts each density of the gradations, which equally divide the density of 0 to 100% into 256 levels, of an image formed on the sheet 3 by the image forming unit 10 to ideal density.

The density adjustment data, which is obtained in this case, includes adjustment values that are used to adjust the intensity of light emitted from the LEDs and adjustment values that are used to adjust developing bias voltage (that is, used to adjust the density for all gradations).

Here, the NVRAM 43 stores new data (new density adjustment data) that is obtained by the latest the density measurement and old data (old density adjustment data) that is obtained by the previous the density measurement. After obtaining the latest density adjustment data by the density measurement of S104, the CPU 40 restores the previous density adjustment data as old data, which has been stored in the NVRAM 43 as new data, and newly stores the latest density adjustment data as new data (S105). These new and old data are used in print processing to be described below.

The CPU 40 executes a print processing after storing the latest density adjustment data (S106). If the measurement execution condition is not satisfied in S101 (No in S101) or a page to be printed next in S102 is not a color page (No in S102) or a page to be printed next in S103 is not the first color page (No in S103), the CPU 40 proceeds to S106 and executes print processing without performance of the density measurement.

If the print processing shown in FIG. 4 starts, first, the CPU 40 determines whether the density measurement is performed during the execution of the subject job (S201). If the density measurement is performed during the execution of the subject job, that is, if a printing operation is interrupted after the printing of the first page of the subject job and the density measurement is performed in S104 of FIG. 3 (Yes in S201), the CPU 40 determines whether a page to be printed next is a color page (S202). Here, a page printed using a plurality of colors of black, yellow, magenta, and cyan toner is referred to as a color page, and a page printed using any one of the colors is referred to as a monochrome page. In addition, a page formed using one color toner except for black can be referred to as not a monochrome page but a color page.

If the density measurement is not performed during the execution of the subject job (No in 5201) or a page to be printed next is a color page (Yes in S202), the CPU 40 performs the density adjustment used for printing the next page by using the new data stored in the NVRAM 43 (S203). That is, in this case, the CPU 40 generates print data supplied to each color exposure units 17K to 17C, and adjusts the intensity of light, which is emitted from the LEDs, in the print data based on the new data (the latest density adjustment data) for each gradation. Further, the CPU 40 sets the developing bias voltage, which is applied to each of the developing rollers 25, on a high-voltage applying circuit 49 based on the new data. Furthermore, the CPU makes a print, which corresponds to one page, on one sheet 3 by the image forming unit 10 (S204).

Moreover, if a page to be printed next is not a color page in S202, that is, if a page to be printed next is a monochrome page (No in S202), the CPU 40 performs the density adjustment used for printing the next page by using the old data (S205). In this case, the CPU 40 adjusts the intensity of light, which is emitted from the LEDs, in the print data based on the old data (the previous density adjustment data) for each gradation, and sets a developing bias voltage based on the old data. Then, the CPU makes one print, which corresponds to one page, in S204.

After printing one page, the CPU 40 finishes the print processing of S106 in FIG. 3 and determines whether the subject job is finished (S107). Further, if there is a remaining page in the subject job (No in S107), the CPU returns to S101 and repeats the same processing. Further, if all printing of pages in the subject job are completed (Yes in S107), the CPU finishes the job execution processing. In addition, the print job of which all pages have completed printing is removed from the print queue.

Figure 6:
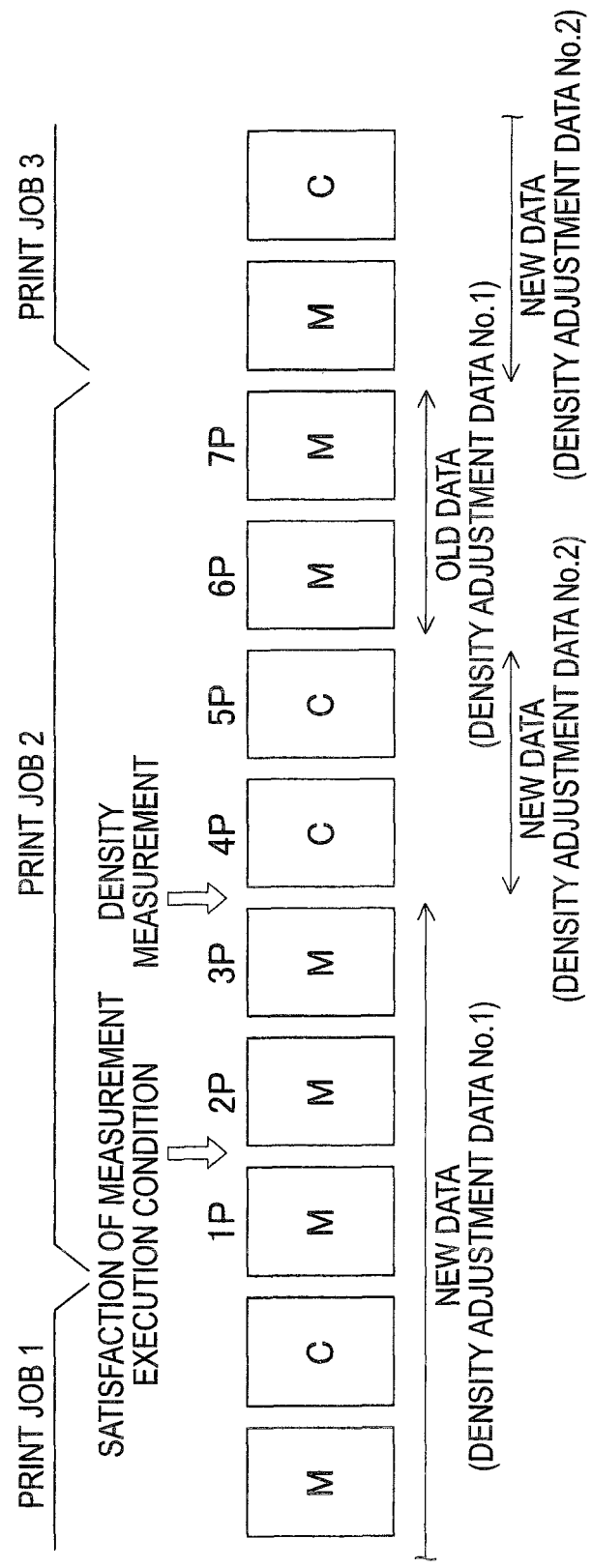
FIG. 6 is a view showing execution examples of a density measurement and a density adjustment of the job execution processing.

FIG. 6 is a view that showing execution examples of the density measurement and the density adjustment of the job execution processing. In this embodiment, the respective pages of print jobs 1, 2 and 3 are printed from the left side to the right side in FIG. 6 (only a part of the pages of the print jobs 1 and 3 are shown). In the print job 2, the first to seventh pages are printed on seven sheets 3 in consecutive order of pages. The first to third pages are monochrome pages, the fourth and fifth pages are color pages, and the sixth and seventh pages are monochrome pages (the monochrome page is represented as M and the color page are represented as C in FIG. 6).

And now, as for the last two pages of the print job 1 and the first page (monochrome page) of the print job 2, the density adjustment is performed using density adjustment data No. 1, which is new data, and the measurement execution condition is satisfied after the printing of the first page. In this case, the CPU 40 does not perform the density measurement of the second and third pages that are monochrome pages, and performs density adjustment of the second and third pages by using the density adjustment data No. 1.

Subsequently, the CPU 40 performs the density measurement before the printing of the fourth page, which is the first color page. Further, the density adjustment data No. 1 is restored as old data, which has become old density adjustment data through the execution of the density measurement, and the density adjustment data. No. 2, which is newly obtained, is stored as new data. After that, the CPU 40 performs the density adjustment of the fourth and fifth pages, which are color pages, by using the density adjustment data No. 2 that is new data. Further, the CPU performs the density adjustment of the sixth and seventh pages, which are monochrome pages, by using the density adjustment data No. 1 that is old data.

Furthermore, in the print job 3 (or a print job later than the print job 3) that is to be performed after the print job 2, the density adjustment of the color page and the monochrome page is performed using the density adjustment data No. 2, which is new data, until at least the measurement execution condition is satisfied again. In other words, the density adjustment data used in the density adjustment of the monochrome page is changed over to new data from old data when the first monochrome page is printed after print job 2 is finished.

(Advantages of this Exemplary Embodiment)

According to this exemplary embodiment, during the image formation of one print job in which monochrome pages and color pages are mixed, when the density measurement is performed with the interrupt of the image formation before the formation of the first color page, the density adjustment of the color page included in the print job is performed using new density adjustment data that is obtained by the density measurement at the time of the interrupt, and the density adjustment of the monochrome page included in the print job is performed using old density adjustment data that is obtained before the density measurement at the time of the interrupt.

Accordingly, it is possible to secure image quality by adjusting the density of the color page included in the print job by using new density adjustment data. Meanwhile, it is possible to prevent the change in shade (density) by adjusting the density of the monochrome page by using the same old density adjustment data between before and after the density measurement. Further, since a color image is formed with the mixture of a plurality of colors, the change in the density of each color causes the color balance on a color page to be lost. In contrast, color balance is not lost on a monochrome page on which an image is formed with only one color. Accordingly, it is considered that the image quality of a monochrome page is less affected by the density measurement as compared to that of a color page. Therefore, it is possible to maintain image quality to some extent by adjustments using old density adjustment data.

Furthermore, from the time of the formation of an image of the first monochrome page included in one of print jobs where an image is formed after the interrupted print job (a print job where the density measurement is performed during the execution of the print job), density adjustment data, which is used for the density adjustment of a monochrome page, is changed over to new density adjustment data from old density adjustment data. Accordingly, the density adjustment data, which is used for the density adjustment of a monochrome page, is changed over to new density adjustment data from old density adjustment data, between the print jobs. As a result, it is possible to prevent the change in shade between monochrome pages included in the respective print jobs.

Moreover, when a measurement execution condition is satisfied during the execution of one print job including color pages, the density measurement is performed if the first color page has not been formed, and the density measurement is not performed during the execution of the print job if the first color page has already been formed. Accordingly, since the density measurement is not performed after the formation of the first color page, it is possible to avoid the change in shade between the color pages of one print job.

In addition, in this embodiment, the density measurement is not performed before the monochrome page even though the measurement execution condition is satisfied. Accordingly, it is possible to delay a timing to perform the density measurement, to suppress the frequency of the performance of the density measurement.

Second Embodiment

Figure 7:
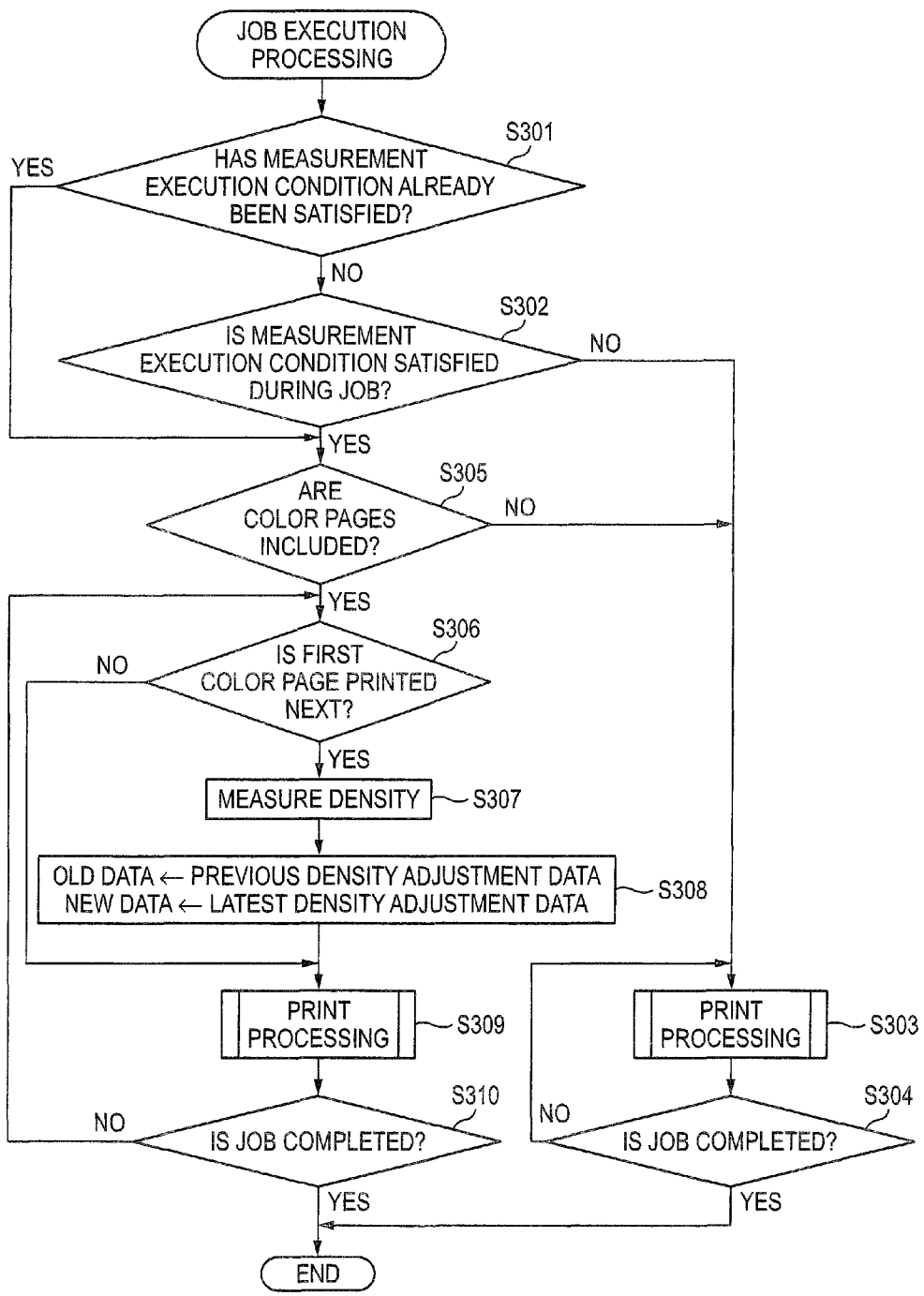
FIG. 7 is a flowchart showing job execution processing according to a second embodiment.

A second embodiment of the invention will be described below with reference to FIG. 7. FIG. 7 is a flowchart showing a job execution processing of this embodiment.

In the first embodiment, during the execution of the print job in the job execution processing, it is determined whether the measurement execution condition is satisfied. However, in this embodiment, before the execution of a print job, it is determined whether the measurement execution condition is satisfied. Meanwhile, the configuration of a printer 1 is the same as that of the printer of the first embodiment. The same components as those of the first embodiment are denoted by the same reference numerals and the description thereof will be omitted.

When a job execution processing shown in FIG. 7 is started, the CPU 40 determines whether a measurement execution condition has already been satisfied (S301). If the measurement execution condition is not satisfied (No in S301), the CPU determines whether the measurement execution condition is satisfied during the execution of a subject job (S302). That is, assuming that the subject job has been executed without the performance of the density measurement, the CPU predicts whether the measurement execution condition is satisfied during the execution of the subject job based on information (the number of printed sheets and the like) such as the current state of an apparatus. Further, if the measurement execution condition is not satisfied during the execution of the subject job (No in S302), the CPU executes the print processing illustrated in FIG. 4 (S303).

Since the density measurement is not performed in this case, the CPU proceeds to No in S201 of FIG. 4, performs the density adjustment in S203 using new data, and makes a print, which corresponds to one page, in S204. After the print processing, the CPU 40 determines whether the subject job is completed (S304). If the subject job is not completed (No in S304), the CPU proceeds to S303 and prints the next page. Further, if the subject job is completed (Yes in S304), the CPU finishes the job execution processing.

Furthermore, if the measurement execution condition has already been satisfied in S301 (Yes in S301) or if the measurement execution condition is satisfied in S302 during the execution of the subject job (Yes in S302), the CPU 40 determines whether the subject job includes color pages (S305). Moreover, if the subject job does not include color pages (No in S305), the CPU proceeds to S303 and executes print processing without performing the density measurement.

Further, if the subject job includes color pages (Yes in S305), the CPU 40 determines whether a page to be printed next is the first color page (S306). Further, if a page to be printed next is the first color page (Yes in S306), the CPU performs the density measurement (S307). Furthermore, the CPU restores new data, which is stored in the NVRAM 43, as old data (that is, previous density adjustment data), and stores density adjustment data, which is newly obtained, as new data (S308). Subsequently, the CPU performs the print processing corresponding to one page (S309), and the CPU returns to S306 if the job is not completed (No in S310).

Moreover, if a page to be printed next is not the first color page (No in S306), the CPU proceeds to S309 and performs printing corresponding to one page without executing the density measurement. After that, if the subject job is completed (Yes in S310), the CPU finishes the job execution processing.

In the job execution processing of this embodiment shown in FIG. 6, the density measurement is performed before the printing of the fourth page that is the first color page not only if the measurement execution condition has already been satisfied when the print job 2 starts to be executed but also if the measurement execution condition is satisfied during the execution of the print job 2. The density measurement is not performed during the execution of the job if the measurement execution condition is satisfied after the printing of the first color page, i.e., after the printing of the sixth page in the job execution processing (FIG. 3) of the first embodiment, for example. In contrast, since the density measurement is performed before the first color page even in the same case in the job execution processing (FIG. 6) of this embodiment, it is possible to secure image quality.

Even in this embodiment, it is possible to secure image quality by adjusting the density of the color page included in the print job by using new density adjustment data. Further, it is possible to prevent the change in shade (density) by adjusting the density of the monochrome page by using the same old density adjustment data before and after the density measurement.

Further, if one print job includes only monochrome pages even though the measurement execution condition is satisfied, the density measurement is not performed during the execution of the job. Accordingly, it is possible to delay a timing to perform the density measurement, and to suppress the frequency of the execution of the density measurement.

According to this embodiment, it is determined whether the measurement execution condition is satisfied during the execution of the print job before the execution of the print job. When it is determined that the measurement execution condition is satisfied, if the print job includes monochrome pages and color pages and there is a monochrome page before the first color page of the print job, the density measurement is performed before the formation of the first color page during the print job.

Accordingly, it is possible to delay the timing for performing the density measurement as compared to when the density measurement is performed before the start of the execution of the print job. Consequently, it is possible to reduce the frequency of the execution of the density measurement. Moreover, since the density measurement is performed before the formation of the first color page, it is possible to prevent the change in shade during the print job.

Third Embodiment

Figure 8:
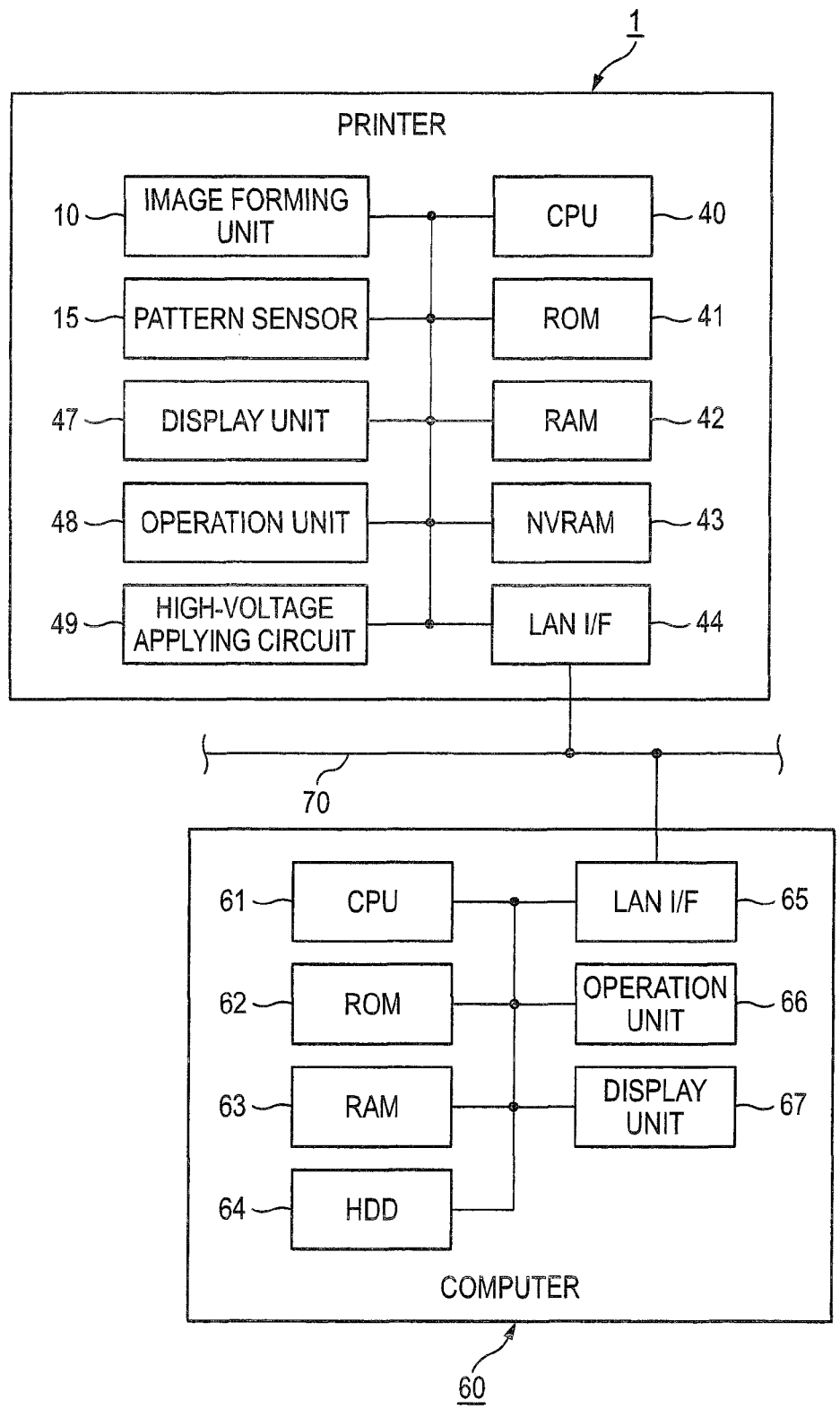
FIG. 8 is a block diagram showing the electrical configuration of an image forming system according to a third embodiment.

A third embodiment of the invention will be described below with reference to FIG. 8 and the above-mentioned FIGS. 3 and 4. In this exemplary embodiment aspects of the invention are applied to an image forming system including a printer 1 and a computer 60. FIG. 8 is a block diagram simply showing the electrical configuration of the image forming system. Meanwhile, the configuration of the printer 1 is the same as that of the printer of the first embodiment. The components similar to those of the first embodiment are denoted by the same reference numerals and the description thereof will be omitted.

The computer 60 (one example of an information processing apparatus) includes a CPU 61 (one example of a measurement unit and an adjustment unit), a ROM 62, a RAM 63, a hard disk drive 64, a network interface 65, a operation unit 66, such as a keyboard or a pointing device, and a display unit 67, such as a display or the like. The hard disk drive 64 stores various programs, such as application software that is used to make image data for printing, and/or a printer driver that is used to control the printer 1. The network interface 65 is connected to the printer 1 through a communication line 70.

A user activates a printer driver corresponding to the printer 1 on the computer. When a user inputs an execution instruction of a print job from the operation unit 66, after setup of printing conditions and so on, the CPU 61 executes substantially the same processing as the above-mentioned job execution processing shown in FIGS. 3 and 4 by the printer driver.

That is, the CPU 61 of the computer 60 obtains information, such as the state of an apparatus, from the printer 1 through the network interface 65 in S101, and determines whether a measurement execution condition is satisfied. Further, if determining that the results of the determination of all of S101, S102, and S103 are yes, the CPU sends an execution instruction of the density measurement to the printer 1 in S104.

When the CPU 40 of the printer 1 received the execution instruction of the density measurement, the CPU 40 forms a density pattern P on a belt 13 and sends detection signals of pattern sensors 15 to the computer 60 through the network interface 44. The CPU 61 of the computer 60 measures the density of each patch based on the detection signals, and calculates density adjustment data based on the result of the density measurement. Meanwhile, the CPU 40 of the printer 1 can measure the density of each patch and send the result of the measurement to the computer 60.

The old data and new data are stored in the NVRAM 43 of the printer 1 as density adjustment data. The CPU 61 of the computer 60 sends the calculated density adjustment data to the printer 1 in S105 and the CPU 61 makes the printer 1 store the new data stored in the NVRAM 43 as old data, and makes the printer 1 store the sent density adjustment data as new data.

According to the determination of S201 and S202 in the printing process of FIG. 4, the CPU 61 generates print data corresponding to one page, which is adjusted for each gradation by the intensity of light emitted from the LEDs, based on old data or new data acquired from the NVRAM 43 of the printer 1 (S203 or S205).

Furthermore, the CPU 61 sends the generated print data, which corresponds to one page, to the printer 1 in S204. The printer 1 makes a print, which corresponds to one page, based on the print data. In this case, if the print data includes the adjustment value of the developing bias voltage, the CPU 40 of the printer 1 sets a developing bias voltage according to the adjustment value.

Even in this embodiment as described above, it is possible to secure image quality by adjusting the density of the color page included in the print job by using new density adjustment data. Further, it is possible to prevent the change in shade (density) by adjusting the density of the monochrome page by using the same old density adjustment data between before and after the density measurement.

Furthermore, it will be possible to execute processing, such as the density measurement or density adjustment, on the computer 60. Accordingly, it is possible to suppress a burden of the printer 1. In particular, if a CPU 61, which has performance higher than the performance of the CPU 40 of the printer 1, is used in the computer 60, it is possible to quickly or accurately perform the density measurement or density adjustment.

In addition, new and old density adjustment data are stored in the hard disk drive 64 of the computer 60, and the CPU 61 can read out the new and old density adjustment data from the hard disk drive 64 when the density adjustment is performed.

Further, a part of the job execution processing can be performed on the printer 1, and the rest of the job execution processing can be performed on the computer 60. For example, the density measurement is performed only on the printer 1, and the CPU 61 of the computer 60 can obtain the density adjustment data from the printer 1 and perform density adjustment. In contrast, the density measurement is performed by the CPU 61 of the computer 60, and the CPU 40 of the printer 1 acquires the density adjustment data from the computer 60 and can perform density adjustment based on the obtained density adjustment data.

Furthermore, a job execution processing corresponding to FIG. 7 or a part of the job execution processing can be executed by the CPU 61 of the computer 60.

Moreover, in the above-mentioned embodiment, the printer 1 and the computer 60 have been connected to each other through a network. However, for example, the printer and the computer can be connected to each other by other methods such as a USB interface.

Other Embodiments

The invention is not limited to the embodiments that have been described with the above description and drawings. For example, the following embodiments are also included in the scope of the invention.

(1) When an image is formed, one print job has been used as a processing batch in the above-mentioned embodiments. However, a processing batch for more and less than a single one print job can be used in the invention.

Figure 9:
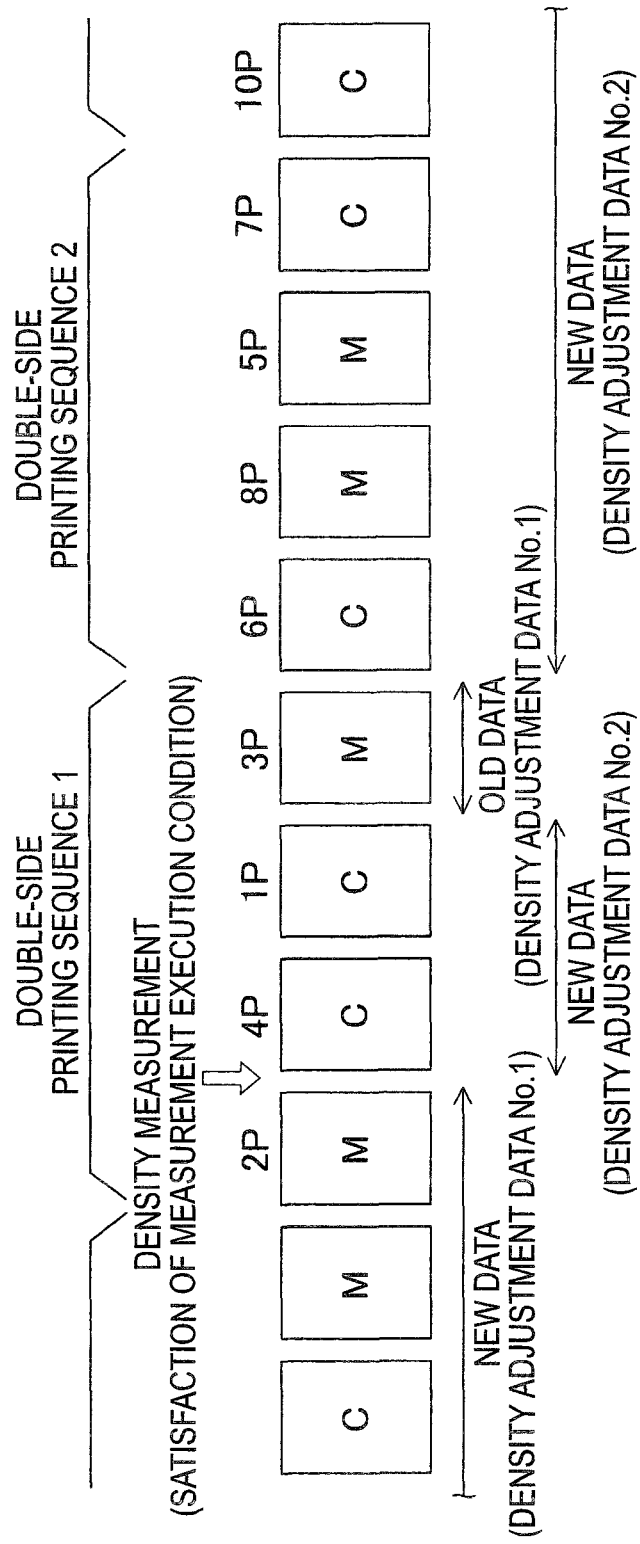
FIG. 9 is a view showing execution examples of the density measurement and a density adjustment of another embodiment.

One such example includes an image forming apparatus that performs double-side printing to print both surfaces of a sheet while retaining a plurality of sheets by the image forming unit. In such a case, a double-side printing sequence, which is used when high-speed double-side printing is performed, will be used as a processing batch of the invention. For example, a printing shown in FIG. 9 is performed on the first two sheets 3 in order of "a second page (the rear surface of the first sheet), a fourth page (the rear surface of the second sheet), a first page (the front surface of the first sheet), and a third page (the front surface of the second sheet). Then, one double-side printing sequence is finished. Subsequently, "a sixth page, an eighth page, a fifth page, and a seventh sheet" are printed likewise by the next double-side printing sequence. That is, printing on second sheet is performed after printing is performed on one surface of the first sheet and before the first sheet is reversed and printing is performed on the other surface of the first page. Therefore, in the double-side printing sequence, it is possible to print at high speed.

If the double-side printing sequence is used as a processing batch, one job in the job execution processing of, for example, FIGS. 3, 4, and 7 will be substituted with a double-side printing sequence.

For example, in the double-side printing sequence 1 as shown in FIG. 9, the density of a monochrome page (second page), which is printed for the first time, is adjusted using the same new data (the density adjustment data No. 1) as the last printed page.

Further, if a measurement execution condition is satisfied after the printing of the page, a printing operation is interrupted and the density is measured while the first sheet 3 is positioned on a reverse path. After new density adjustment data No. 2 is obtained by the density measurement, the printing operation is restarted. The density of the next two color pages (the fourth and first pages) is adjusted using density adjustment data No. 2 that is new data. The density of the next monochrome page (the third page) is adjusted using old data (density adjustment data No. 1). The density is adjusted by using new data (density adjustment data No. 2) until at least the measurement execution condition is satisfied again after the double-side printing sequence 2.

Accordingly, the density of the color page, which is included in the double-side printing sequence where the density measurement is performed on the way, is adjusted using density adjustment data No. 2 that is newly obtained. Further, the density of a monochrome page is adjusted using old density adjustment data No. 1. Accordingly, it is possible to prevent the change in shade between the color pages included in one double-side printing sequence and between the monochrome pages. Further, for example, even though both surfaces of one sheet, which is printed by one double-side printing sequence, are monochrome pages and the density measurement is performed during the printing of both pages, it is possible to prevent the change in shade on both surfaces.

In addition, the double-side printing sequence can perform one sequence on three or more sheets.

Furthermore, a plurality of jobs can be used as one processing batch. For example, the invention may be applied to a series of jobs that are related to each other, i.e. jobs received from the same computer (or a user), or jobs having common attributes (printing setting or the like) can be used as one processing batch. Accordingly, it is possible to prevent the change in shade between these jobs.

Moreover, it is possible to apply the invention even when, for example, several hundred sheets are printed as one processing batch.

(2) If the measurement execution condition is satisfied (or if the measurement execution condition is satisfied in the processing batch), the density measurement has been performed in the above-mentioned embodiments directly before the first color page is printed. However, the density measurement is not necessarily performed directly before the first color page is printed. As long as the density measurement is performed during the execution of the processing batch, the density measurement can be performed before several pages of the first color page, for example.

(3) In the above-mentioned embodiments, a printer forms an image by using an electrophotographic method. However, the invention may also be applied to, for example, another type of image forming apparatus such as an ink jet image forming apparatus. Further, the invention will be applied to, for example, the printing of data received by a facsimile, the printing (copying) of data read by a scanner, and the printing (direct printing) of data acquired from an external storage medium, as the formation of an image.

(4) In the above-mentioned embodiments, both the intensity of light emitted from the exposure unit and a developing bias voltage have been adjusted based on the density adjustment data, which is obtained by the density measurement. However, either one of these can be adjusted. Further, the voltage applied to the charger or voltage applied to the transfer roller, or the like can be adjusted. Further, in the case of the ink jet image forming apparatus, the amount of ink discharged from a head can be adjusted based on the density adjustment data that is obtained by the density measurement.

What is claimed is:

1. An image forming apparatus comprising:
    an image forming unit configured to form an image based on a print job including at least one monochrome page and at least one color page;
    a memory;
    a controller configured to:
        interrupt the print job of the image forming unit to form a density pattern by controlling the image forming unit;
        obtain old density adjustment data stored in the memory;
        obtain new density adjustment data by measuring the density pattern;
        resume the print job;
        adjusts the density of a color page which is included in the print job, the color page formed subsequent to the resuming of the print job, by using the new density adjustment data; and
        adjusts the density of a monochrome page which is included in the print job, the monochrome page formed subsequent to the resuming of the print job, by using the old density adjustment data.

2. The image forming apparatus according to claim 1, wherein after the interrupted print job is completed, the controller changes the old density adjustment data to be the new density adjustment data.

3. The image forming apparatus according to claim 1,
wherein, before the execution of the image formation of the print job, the controller determines whether the measurement execution condition is satisfied during the image formation of the print job,
when the controller determines that the measurement execution condition is satisfied and there is a monochrome page before a first color page of the print job, the controller performs the density measurement before the formation of the first color page during the image formation of the print job.

4. The image forming apparatus according to claim 1,
wherein the image forming unit includes a plurality of development units, which change electrostatic latent images into visible images using a developer, and
wherein the controller adjusts a voltage applied to the development units at the time of the density adjustment based on the density adjustment data.

5. An image forming system comprising:
an image forming apparatus comprising:
an image forming unit configured to form an image based on a print job including at least one monochrome page and at least one color page;
a memory;
a controller configured to:
interrupt the print job of the image forming unit to form a density pattern by controlling the image forming unit;
obtain old density adjustment data stored in the memory
obtain new density adjustment data by measuring the density pattern;
adjust the density of a color page which is included in the print job, the color page formed subsequent to the resuming of the print job, by using the new density adjustment data; and
adjust the density of a monochrome page which is included in the print job, the monochrome page formed subsequent to the resuming of the print job, by using the old density adjustment data.

* * * * *